United States Patent [19]

Mark

[11] 4,110,299

[45] Aug. 29, 1978

[54] FLAME-RETARDANT POLYCARBONATE COMPOSITION

[75] Inventor: Victor Mark, Evansville, Ind.

[73] Assignee: General Electric Company, Pittsfield, Mass.

[21] Appl. No.: 733,016

[22] Filed: Oct. 15, 1976

[51] Int. Cl.$^2$ .................... C08K 5/45; C08K 5/34; C08K 5/15

[52] U.S. Cl. .................... 260/37 PC; 260/45.7 S; 260/45.7 R; 260/45.8 RW; 260/45.8 A; 260/45.8 N; 260/45.8 SN; 260/45.9 NC; 260/45.95 G; 260/824 R; 260/873

[58] Field of Search ............ 260/45.7 S, 45.7 R, 260/45.8 RW, 45.8 A, 45.8 N, 45.8 SN, 45.8 NZ, 45.9 NC, 45.95 G, 37 PC, 824 R, 873

[56] References Cited

U.S. PATENT DOCUMENTS

| | | | |
|---|---|---|---|
| 3,357,942 | 12/1967 | Jackson et al. | 260/45.8 N |
| 3,535,300 | 10/1970 | Gable | 260/45.8 SN |
| 3,673,278 | 6/1972 | Bialous | 260/873 |
| 3,728,303 | 4/1973 | Kometani et al. | 260/45.7 R |
| 3,775,367 | 11/1973 | Nouvertné | 260/45.9 R |
| 3,845,007 | 10/1974 | Nouvertné et al. | 260/37 PC |
| 3,909,490 | 9/1975 | Mark | 260/45.7 S |
| 3,917,559 | 11/1975 | Mark | 260/45.7 S |
| 3,926,908 | 12/1975 | Mark | 260/45.7 S |
| 3,933,734 | 1/1976 | Mark et al. | 260/45.7 S |
| 3,948,851 | 4/1976 | Mark | 260/45.7 S |
| 3,951,910 | 4/1976 | Mark | 260/45.9 NC |
| 3,953,396 | 4/1976 | Mark | 260/45.95 G |
| 3,971,756 | 7/1976 | Bialous et al. | 260/824 R |

*Primary Examiner*—V. P. Hoke
*Attorney, Agent, or Firm*—Salvatore C. Mitri; William F. Mufatti

[57] ABSTRACT

An improved flame-retardant polycarbonate composition of an aromatic carbonate polymer in admixture with an organic alkali metal salt or an organic alkaline earth metal salt or mixtures thereof, which composition has in admixture therewith an additive which is an inorganic halide or an organic monomeric or polymeric aromatic or heterocyclic halide.

14 Claims, No Drawings

FLAME-RETARDANT POLYCARBONATE COMPOSITION

This invention is directed to an improved flame-retardant polycarbonate composition of an aromatic carbonate polymer in admixture with an organic alkali metal salt or an organic alkaline earth metal salt or mixtures thereof, the improvement which comprises having in admixture with said polycarbonate an additive which is an inorganic halide or an organic monomeric or polymeric aromatic or heterocyclic halide. This composition may additionally contain a fluorinated polyolefin, fibrous glass or a siloxane in admixture therewith.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame-retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame-retardant additives which are employed by mixing with products to render such materials self-extinguishing or flame retardant. Such flame-retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame-retardant additives with the base product polycarbonate resins. Many of these known additives have a degrading effect upon the polymer.

DESCRIPTION OF THE INVENTION

It has been surprisingly discovered that the flame retardancy of an aromatic polycarbonate composition containing certain additives which are selected from organic alkali metal salts or organic alkaline earth metal salts can be improved by the co-addition of an additive which is an inorganic halide or an organic monomeric or polymeric aromatic or heterocyclic halide. Also, it is desirable to admix with the polycarbonate composition a fluorinated polyolefin, fibrous glass or a siloxane in order to increase the flame retardancy of the polycarbonate composition and also to prevent the polycarbonate from dripping in the proximity of a flame.

The combination of the organic salt and inorganic halide or organic monomeric or polymeric aromatic or heterocyclic halide not only results in improved flame retardancy but allows the use of even lower concentrations of each of the salts than is possible in the individual formulations. The fact that the effect of the combination of salt and inorganic or organic halide on flame retardancy is larger than the sum of the two separate salts suggests a synergistic interaction. The flame retardancy of organic alkali metal salts and organic alkaline earth metal salts containing no-halogen substituents or low halogen substituents being greatly enhanced by the addition of inorganic or organic halides. The addition of a fluorinated polyolefin, fibrous glass or a siloxane renders the polycarbonate composition non-dripping in the proximity of a flame.

The organic alkali metal salts and alkaline earth metal salts are selected from the group consisting of:
 alkali metal salt and alkaline earth metal salts of monomeric or polymeric aromatic sulfonic acids;
 alkali metal salts and alkaline earth metal salts of monomeric or polymeric aromatic sulfonesulfonic acids;
 alkali metal salts and alkaline earth metal salts of unsubstituted sulfonic acids of aromatic ketones;
 alkali metal salts and alkaline earth metal salts of sulfonic acids of aromatic sulfides;
 alkali metal salts and alkaline earth metal salts of either monomeric or polymeric aromatic ether sulfonic acids;
 alkali metal salts and alkaline earth metal salts of either monomeric or polymeric aromatic amide sulfonic acids, and mixtures of these salts.

These salts are either non-halogenated or contain small amounts of halogen as substituents. These organic alkali metal and alkaline earth metal salts are fully described as follows:

U.S. Pat. No. 3,933,734 (A) issued on Jan. 20, 1976, titled *FLAME RETARDANT POLYCARBONATE COMPOSITION*, discloses a flame-retardant polycarbonate composition of an aromatic carbonate polymer containing in admixture therewith, an additive which is the metal salt of either the monomeric or polymeric aromatic sulfonates or mixtures thereof.

U.S. Pat. No. 3,948,851 (B) issued on Apr. 6, 1976, titled *FLAME RETARDANT POLYCARBONATE COMPOSITION*, discloses a flame-retardant polycarbonate composition of an aromatic carbonate polymer containing in admixture therewith, an additive which is the metal salt of either the monomeric or polymeric aromatic sulfonesulfonates or mixtures thereof.

U.S. Pat. No. 3,926,908 (C) issued on Dec. 16, 1975, titled *FLAME RETARDANT POLYCARBONATE COMPOSITION*, discloses a flame-retardant polycarbonate composition of an aromatic carbonate polymer containing in admixture therewith, an additive which is the metal salt of substituted and unsubstituted sulfonic acids of aromatic ketones and mixtures thereof.

U.S. Pat. No. 3,909,490 (D) issued Sept. 30, 1975, titled *FLAME RETARDANT POLYCARBONATE COMPOSITION*, discloses a flame-retardant polycarbonate composition of an aromatic carbonate polymer containing in admixture therewith, an additive which is the metal salt of substituted and unsubstituted sulfonic acids of aromatic sulfides and mixtures thereof.

U.S. Pat. No. 3,953,396 (E) issued Apr. 27, 1976, titled *FLAME RETARDANT POLYCARBONATE COMPOSITION*, discloses a flame-retardant polycarbonate composition of an aromatic carbonate polymer containing in admixture therewith, an additive which is the metal of either the substituted or unsubstituted sulfonic acid of an aromatic ether.

U.S. Pat. No. 3,951,910 (F) issued Apr. 2, 1976, titled A *FLAME RETARDANT POLYCARBONATE COMPOSITION*, discloses a flame-retardant polycarbonate composition of an aromatic carbonate polymer containing in admixture therewith, a metal salt of either the monomeric or polymeric substituted and unsubstituted aromatic amide sulfonic acid or mixtures thereof.

Patents (A) through (F) are incorporated herein by reference. The metal salts of any of these patents, as well as mixtures of any of the metal salts of any of the patents, may be used herein.

These organic alkali metal salts and alkaline earth metal salts are used in amounts of from 0.01 to about 5.0 parts per hundred parts of the aromatic carbonate polymer.

The preferred organic alkali metal and alkaline earth metal salts include sodium benzenesulfonate; potassium benzenesulfonate; sodium naphthalene-1-sulfonate; sodium diphenylether-4-sulfonate; sodium diphenylsulfone-3-sulfonate; potassium naphthalene-2-sulfonate; sodium toluene-4-sulfonate; dipotassium diphenylsulfone-3,3'-disulfonate; calcium biphenyl-4-sulfonate; polysodium polystyrene sulfonate; sodium diphenylsulfide-4-sulfonate.

The inorganic halides are selected from the group consisting of alkali metal halides and alkaline earth metal halides and mixtures thereof. The preferred inorganic halides include sodium chloride; potassium iodide, potassium bromide; sodium bromide; and potassium chloride.

These inorganic halides are used in amounts of from 0.01 to about 5.0 parts per hundred parts of the aromatic carbonate polymer.

In the practice of this invention, the types of organic halides employed herein may be monomeric or polymeric aromatic or heterocyclic or mixtures of these. The monomeric aromatic halide can be represented by the following formulas:

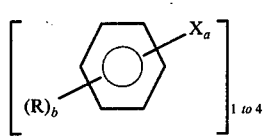

wherein R is either hydrogen, alkyl, aryl, alkoxy, aryloxy, alkylthio, arylthio, alkylsulfonyl, arylsulfonyl of 1 to 20 carbon atoms or an electron withdrawing radical; X is independently chlorine or bromine; a is an integer of 1 to 6 and b is 6-a. Also, R can carry substituents which are electron withdrawing substituents $R'_c R''_d$    II.

wherein R' may be either:

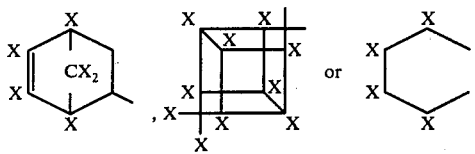

wherein X is independently chlorine or bromine; R" is an aryl radical of 1-4 aromatic rings; c is an integer of 1-2; and d is an integer of 1-2.

These cycloaliphatic aromatic compounds are described in U.S. Pat. No. 3,917,559, which is incorporated herein.

The polymeric aromatic form of the organic halide can be represented by the following formula:

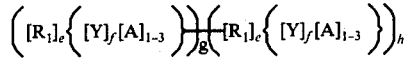

wherein [A] is selected from the following formula:

$(O)_i R_2 (X)_j$    IV.

wherein (O) is oxygen; $i$ is an integer of 0 to 4; $R_2$ is an aromatic radical of one to four aromatic rings; X is chlorine or bromine; $j$ is an integer of 0 to 10; $R_1$ is an organic radical of 1-20 carbon atoms and is either alkyl, aralkyl, alkenyl, aralkenyl, aryl, arylene, alkylene, aralkylene, alkenylene, aralkenylene, alkylidene, aralkylidene, alkenylidene or aralkenylidene, and the group [A], as well as a trivalent and tetravalent aromatic nucleus. It should also be understood that the radical $[R_1]$ can also contain halogen substituents which would be an electron withdrawing radical. [Y] is a di-, tri- or tetravalent radical selected from the following:

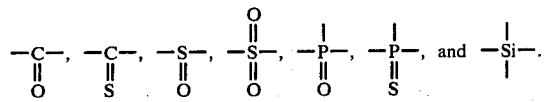

$e$ is an integer of 0-3; $f$ is an integer of 0-2; $g$ is an integer of 0-2000 and $h$ is an integer of from 0-2000; provided, however, that the sum of $g$ and $h$ must be at least 4 and can be as high as 2000. As shown, the selections of $g$ and $h$ can be random or equal or one can be zero.

In the practice of this invention, it is to be understood that the polymeric structure can be either a homopolymer, a copolymer, a random copolymer, a block copolymer or a random-block copolymer, or mixtures of these polymeric forms.

The heterocyclic form of the organic halide can be represented by the following formula:

$X_{0-15} R_4$    V.

wherein X is independently chlorine or bromine and R is an organic nucleus selected from the group of organic heterocyclic nuclei consisting of

    A.

wherein Z is selected from the hetero atoms consisting of sulfur, oxygen and nitrogen,

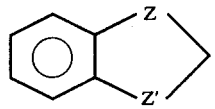    B.

wherein Z and Z' are independently selected from the group consisting of carbon and the hetero atoms, nitrogen, sulfur and oxygen, providing that at least on Z is a hetero atom,

C.

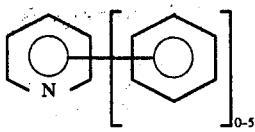

These heterocyclic compounds are described in U.S. Pat. No. 3,919,167 which is incorporated herein by reference.

The electron withdrawing radicals as used herein are the halo-, nitro-, trihalomethyl- and cyano- electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185-186), and *Physical Organic Chemistry* by Jack Hine, McGraw-Hill Book Company, Inc. 1962 (pages 5, 32 and 85-93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

The organic halides are used in amounts of from 0.10 to about 10.0 parts per hundred parts of aromatic carbonate polymer.

The preferred organic halides include decabromodiphenyl ether; bis(pentabromophenoxy) ethane; decabromodiphenyl carbonate; tetrachloro-BPA-polycarbonate; tetrabromo-BPA-polycarbonate and poly(p-chlorostyrene), "BPA" being bisphenol A.

The fluorinated polyolefins which can be used in this invention are commercially available or can be prepared by known processes. They are white solids obtained by polymerization of tetrafluoroethylene, for example, in aqueous media with free radical catalysts, e.g., sodium, potassium or ammonium peroxydisulfates at 100 to 1,000 psi at 0°-200° C and preferably at 20°-100° C. See Brubaker, U.S. Pat. No. 2,393,967. While not essential, it is preferred to use the resins in the form of relatively large particles, e.g., of average size 0.3 to 0.7 mm, mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous materials. Such preferred polytetrafluoroethylenes are designated by ASTM as Type 3, and are available commercially from the E. I. DuPont de Nemour and Company (TEFLON Type 6).

The amount of the fluorinated polyolefin to be used can vary widely but usually will be from about 0.01 to about 2.0 weight percent based on total weight of the resin.

Additionally, glass fibers can be used with the composition of this invention. By glass fibers, it is understood that glass silk, as well as all glass fiber materials derived therefrom including glass fiber fabrics, rovings, stable fibers and glass fiber mats, are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛ inch to about 1 inch long, preferably less than ¼ inch in length. These are called chopped strands. Some of these binding agents are polymers such as polyvinyl acetate, particular polyester resins, polycarbonates, starch, acrylic melamine, polyvinyl chloride, polyethylene oxide or polyvinyl alcohol. The composition can contain from about 1 to about 50 weight percent of the glass fibers.

The siloxanes which may be employed in the instant invention include compounds of the formula:

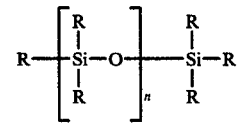

wherein the R's are independently selected from the group consisting of hydrogen, hydroxy, alkyl of from 1 to 6 carbon atoms, alkoxy of from 1 to 6 carbon atoms, alkenyl from 2 to 8 carbon atoms; alkynyl from 2 to 10 carbon atoms, aryl from 6 to 8 carbon atoms, arylox from 6 to 10 carbon atoms. These may be optionally substituted by halogen, hydroxy, amino, alkoxy of 1 to 6 carbon atoms, aryloxy of 6 to 10 carbon atoms, alkylthio and alkylamino wherein the alkyl portion contains 1 to 6 carbon atoms, arylthio and arylamino wherein the aryl portion contains 6 to 10 carbon atoms and wherein $n$ is an integer having a value of one or more. Examples of these compounds include octaphenylcyclotetrasiloxane; 2,4,6,8-tetramethyl-2,4,6,8-tetravinylcyclotetrasiloxane; α,ω-divinylpoly-(dimethylsiloxane); 1,1,3,3-tetramethyl-1,3-divinylsiloxane; branched methyl phenyl silicone fluid; linear dimethylsiloxane (1000 centipoise viscosity); trimethylsilyl terminated methylhydrogensiloxy diphenylsiloxy copolymers; α, ω-dimethylpoly (dimethylmethylvinylsiloxane); trimethylsilyl terminated polymethylhydrogen siloxane; octachlorooctaphenylcyclotetrasiloxane; diorganopolysiloxane gums having a viscosity of 80 million to 100 million centistokes; branched methyl trichlorophenyl silicone fluid; linear bis(pentafluorophenyl) siloxane branched methylphenylsiloxane copolymer; etc., and mixtures thereof. These are prepared by known methods in the art, as for example, by the methods set forth in U.S. Pat. Nos. 2,445,794; 2,448,756; 2,484,595 and 3,514,424.

The amount of the siloxane to be used can be from about 0.01 to about 5.0 weight percent based on the total weight of the resin.

In the practice of this invention, any of the aromatic polycarbonates can be employed herein having a refractive index in the range of 1.54 to 1.65. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl) propane, (3,3'-dichloro-4,4'-dihydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihyric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester of a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone), etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The composition of this invention is prepared by admixing the aromatic carbonate polymer with the organic salts and inorganic and organic halides.

The compositions of the instant invention may contain fillers, pigments, dyes, antioxidants, stabilizers, ultraviolet light absorbers, mold release agents and other additives commonly employed in non-opaque polycarbonates resin formulations. Furthermore, the shaped articles may be coated with, for example, mar- or scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred (100) parts of an aromatic polycarbonate, prepared by reacting 2,2-bis(4-hydroxyphenyl) propane and phosgene in the presence of an acid acceptor and a molecular weight regulator and having an intrinsic viscosity of 0.57 is mixed with the amounts of additives either singly or in combination as listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315° C into test bars of about 5 in. by ½ in. by about one-sixteenth-one-eighth in. thick into test squares of about 2 in. by 2 in. by about one-eighth in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not travel vertically for more than one-eighth inch of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

The results of the different additives within the scope of the instant invention are as follows with a control being the aromatic polycarbonate as prepared above without the additives of the type set forth herein. As used in the Table, Additive I is the organic metal salt, Additive III is the inorganic or organic halide and Additive II is either fibrous glass, siloxane or Teflon, as indicated.

TABLE

| Sample | Additive I | Amount (Parts per Hundred) | Additive II | Amount (Parts per Hundred) | Additive III | Amount (Parts per Hundred) | Flame Out Time Seconds | No. of Drips Per 5 Test Bars | UL-94 Rating |
|---|---|---|---|---|---|---|---|---|---|
| Control | — | — | — | — | — | — | 26 | 13 | Burning |
| A | Potassium diphenylsulfone-4-sulfonate | 0.2 | — | — | — | — | 7.7 | 4 | V-II |
| B | — | — | Teflon-6 | 0.1 | — | — | 30 | 8 | Burning |
| C | — | — | — | — | Potassium bromide | 0.2 | 5.9 | 6 | V-II |
| D | Potassium diphenylsulfone-4-sulfonate | 0.1 | Teflon-6 | 0.05 | Potassium bromide | 0.1 | 3.3 | 0 | V-0 |
| E | Dipotassium diphenylsulfone-3,3'-disulfonate | 0.1 | — | — | — | — | 6.7 | 4 | V-II |
| F | Dipotassium diphenylsulfone-3,3'-disulfonate | 0.1 | Teflon-6 | 0.05 | — | — | 8.2 | 0 | V-I |
| G | Dipotassium diphenylsulfone-3,3'-disulfonate | 0.1 | Teflon-6 | 0.05 | Potassium bromide | 0.1 | 4.2 | 0 | V-0 |
| H | Sodium diphenylsulfone-3-sulfonate | 0.4 | — | — | — | — | 4.8 | 4 | V-II |
| I | — | — | — | — | Decabromodiphenyl ether | 0.2 | 3.2 | 1 | V-I |
| J | Sodium diphenylsulfone-3-sulfonate | 0.1 | Teflon-6 | 0.05 | Decabromodiphenyl ether | 0.2 | 3.8 | 0 | V-0 |
| K | — | — | — | — | Tetrachloro-BPA-polycarbonate | 4.0 | 6.2 | 11 | V-II |
| L | — | — | — | — | Tetrabromo-BPA-polycarbonate | 8.2 | 4.0 | 6 | V-II |
| M | Sodium diphenylsulfone-3-sulfonate | 0.2 | — | — | Tetrachloro-BPA-polycarbonate | 2.0 | 5.2 | 3 | V-II |
| N | Sodium diphenylsulfone-3-sulfonate | 0.2 | Teflon-6 | 0.1 | Tetrachloro-BPA-polycarbonate | 2.0 | 4.1 | 0 | V-0 |
| O | Sodium diphenylsulfone-3-sulfonate | 0.2 | Teflon-6 | 0.1 | Tetrabromo-BPA-polycarbonate | 1.5 | 3.6 | 0 | V-0 |
| P | Sodium toluene-4-sulfonate | 0.5 | — | — | — | — | 8.2 | 3 | V-II |
| Q | Sodium toluene-4-sulfonate | 0.5 | Teflon-6 | 0.1 | — | — | 11.6 | 0 | V-I |
| R | Sodium toluene-4-sulfonate | 0.2 | Teflon-6 | 0.05 | Decabromodiphenyl ether | 0.2 | 4.4 | 0 | V-0 |
| S | Sodium naphthalene-1-sulfonate | 0.2 | — | — | — | — | 5.2 | 3 | V-II |
| T | Sodium naphthalene-1-sulfonate | 0.2 | — | — | Tetrachloro-BPA-polycarbonate | 2.0 | 3.8 | 6 | V-II |
| U | Sodium naphthalene-1-sulfonate | 0.2 | Teflon-6 | 0.1 | Tetrachloro-BPA-polycarbonate | 1.0 | 4.2 | 0 | V-0 |
| V | Sodium benzenesulfonate | 0.5 | — | — | — | — | 4.6 | 3 | V-II |
| W | — | — | — | — | Bis(pentabro- | 5.0 | 11.8 | 10 | V-II |

TABLE-continued

| Sample | Additive I | Amount (Parts per Hundred) | Additive II | Amount (Parts per Hundred) | Additive III | Amount (Parts per Hundred) | Flame Out Time Seconds | No. of Drips Per 5 Test Bars | UL-94 Rating |
|---|---|---|---|---|---|---|---|---|---|
| X | Sodium benzenesulfonate | 0.2 | Teflon-6 | 0.05 | Bis(pentabromophenoxy)-ethane | 2.0 | 3.6 | 0 | V-0 |
| Y | — | — | — | — | Poly(p-chorostyrene) | 5.0 | 8.2 | 10 | V-II |
| Z | Sodium benzenesulfonate | 0.4 | — | — | Poly(p-chlorostyrene) | 2.0 | 3.8 | 2 | V-II |
| A' | Sodium benzenesulfonate | 0.2 | V-0 | 0.05 | Poly(p-chlorostyrene) | 1.0 | 4.6 | 0 | V-O |
| B' | Sodium 4-chlorobenzenesulfonate | 0.5 | — | — | — | — | 4.6 | 2 | V-II |
| C' | Sodium 4-chlorobenzenesulfonate | 0.5 | Teflon-6 | 0.05 | — | — | 5.1 | 0 | V-II |
| D' | Sodium 4-chlorobenzenesulfonate | 0.4 | Teflon-6 | 0.05 | Tetrabromo-BPA-polycarbonate | 2.0 | 3.3 | 0 | V-0 |
| E' | Calcium diphenylether-4-sulfonate | 0.5 | — | — | — | — | 11.6 | 13 | V-II |
| F' | Calcium diphenylether-4-sulfonate | 0.2 | Teflon-6 | 0.1 | Tetrachloro-BPA-polycarbonate | 1.0 | 4.8 | 0 | V-0 |
| G' | — | — | — | — | Pentabromotoluene | 1.0 | 3.6 | 11 | V-II |
| H' | Sodium benzenesulfonate | 0.2 | Teflon-6 | 0.05 | Pentabromotoluene | 1.0 | 2.8 | 0 | V-0 |
| I' | — | — | — | — | Decabromodiphenyl carbonate | 2.0 | 3.6 | 6 | V-II |
| J' | Sodium toluene-4-sulfonate | 0.1 | Teflon-6 | 0.1 | Decabromodiphenyl carbonate | 1.0 | 4.2 | 0 | V-0 |
| K' | Sodium toluene-4-sulfonate | 0.2 | Teflon-6 | 0.1 | Potassium bromide | 0.2 | 4.8 | 0 | V-0 |
| L' | — | — | Branched methyl phenyl silicone fluid | 2.0 | — | — | 18.0 | 10 | V-II |
| M' | Sodium benzene sulfonate | 0.5 | Branched methyl phenyl silicone fluid | 2.0 | — | — | 9.8 | 4 | V-II |
| N' | Sodium benzene sulfonate | 0.3 | Branched methyl phenyl silicone fluid | 2.0 | Decabromodiphenyl ether | 1.0 | 4.8 | 0 | V-0 |
| O' | — | — | Fibrous glass | 6.0 | — | — | 12.2 | 3 | V-II |
| P' | Sodium toluene-4-sulfonate | 0.5 | Fibrous glass | 6.0 | Potassium bromide | 0.2 | 5.2 | 0 | V-I |
| Q' | Sodium toluene-4-sulfonate | 0.5 | Fibrous glass | 6.0 | Potassium bromide | 0.5 | 4.2 | 0 | V-0 |
| R' | Sodium 4-chlorobenzene sulfonate | 0.4 | Fibrous glass | 4.0 | — | — | 5.6 | 2 | V-II |
| S' | Sodium 4-chlorobenzene sulfonate | 0.4 | Fibrous glass | 6.0 | — | — | 6.2 | 0 | V-I |
| T' | Sodium 4-chlorobenzene sulfonate | 0.3 | Fibrous glass | 6.0 | Tetrabromo-BPA-polycarbonate | 2.0 | 3.8 | 0 | V-0 |
| U' | Sodium 4-chlorobenzene sulfonate | 0.2 | Fibrous glass | 10.0 | Decabromodi- | 1.0 | 4.2 | 0 | V-0 |

It will thus be seen that the objects set forth above among those made apparent from the preceding description are efficiently attained and, since certain changes may be made in carrying out the above process and in the composition set forth without departing from the scope of this invention, it is intended that all matters contained in the above description shall be interpreted as illustrative and not in a limiting sense.

What is claimed is:

1. An improved flame-retardant polycarbonate composition of an aromatic carbonate polymer in admixture with 0.01 to about 5.0 parts per hundred parts of the aromatic carbonate polymer of an additive selected from the group consisting of organic alkali metal salts of aromatic sulfonic acids, organic alkaline earth metal salts of aromatic sulfonic acids or mixtures thereof, the improvement which comprises having in admixture with the flame retardant aromatic carbonate polymer an additive which is an inorganic halide selected from alkali metal and alkaline earth metal halides wherein the halide substituent is bromine, chlorine or iodine, and an organic monomeric, polymeric aromatic and heterocyclic halide or mixtures thereof; said inorganic halide being present in amounts of from 0.01 to about 5.0 parts per hundred parts of the aromatic carbonate polymer; said monomer aromatic halide is present in amounts of from 0.10 to about 10.0 parts per hundred parts of aromatic carbonate polymer and is selected from the following formulae:

a.

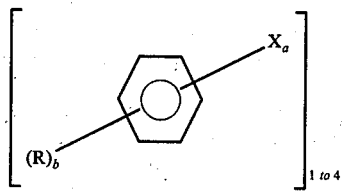

wherein R is either hydrogen, alkyl, aryl, alkoxy, aryloxy, alkylthio, arylthio, alkysulfonyl, arylsufonyl of 1 to 20 carbon atoms or an electron withdrawing radical; X is independently chlorine or bromine; $a$ is integer of 1 1 to 6 and $b$ is 6 and $b$ is 6-$a$ and wherein R can be substituted by electron withdrawing substituents;

b. $R'_c R''_d$ wherein R' may be either:

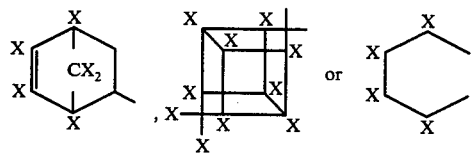

wherein X is independently chlorine or bromine; R" is an aryl radical of 1–4 aromatic rings; $c$ is an integer of 1–2; and $d$ is an integer of 1–2; said polymeric aromatic halide is present in amounts of from 0.10 to about 10.0 parts per hundred parts of aromatic carbonate polymer and has the following formula:

$$([R_1]_e\{[Y]_f[A]_{1-3}\})_g\text{—}([R_1]_e\{[Y]_f[A]_{1-3}\})_h$$

wherein [A] is selected from the following formula:

$$(O)_i R_2 (X)_j$$

wherein (O) is oxygen; $i$ is an integer of 0 to 4; $R_2$ is an aromatic radical of one to four aromatic rings; X is chlorine or bromine; $j$ is an integer of 0 to 10; $R_1$ is an organic radical of 1–20 carbon atoms and is either alkyl, aralkyl, alkenyl, aralkenyl, aryl, arylene, alkylene, aralkylene, alkenylene, aralkenylene, alkylidene, aralkylidene, alkenylidene or aralkenylidene, and the group [A], as well as a trivalent and tetravalent aromatic nucleus and $R_1$ can contain an electron withdrawing radical; [Y] is a di-, tri- or tetravalent radical selected from the following:

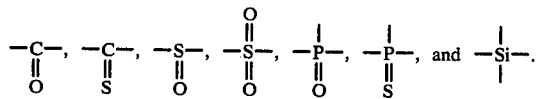

$e$ is an integer of 0–3; $f$ is an integer of 0–2; $g$ is an integer of 0–2000 and $h$ is an integer of from 0–2000; provided, however, that the sum of $g$ and $h$ must be at least 4 and can be as high as 2000; and, said heterocyclic halide is present in amounts of from 0.10 to about 10.0 parts per hundred parts of aromatic carbonate polymer and has the following formula:

$$X_{0\text{-}15}R_4$$

wherein X is independently chlorine or bromine and R is an organic nucleus selected from the group of organic heterocyclic nuclei consisting of

A.

wherein Z is selected from the hetero atoms considering of sulfur, oxygen and nitrogen,

B.

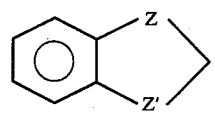

wherein Z and Z' are independently selected from the group consisting of carbon and the hetero atoms, nitrogen, sulfur and oxygen, providing that at least one Z is a hetero atom,

C.

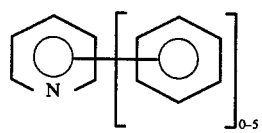

2. The composition of claim 1 wherein the organic alkali metal salt or alkaline earth metal salt is selected from the group consisting of:
   alkaline metal salts and alkaline earth metal salts of monomeric or polymeric aromatic sulfonic acids;
   alkali metal salts and alkaline earth metal salts of monomeric or polymeric aromatic sulfonesulfonic acids;
   alkali metal salts and alkaline earth metal salts of unsubstituted sulfonic acids of aromatic ketones;
   alkali metal salts and alkaline earth metal salts of sulfonic acids of aromatic sulfides;
   alkali metal salts and alkaline earth metal salts of either monomeric or polymeric aromatic ether sulfonic acids;
   alkali metal salts and alkaline earth metal salts of either monomeric or polymeric aromatic amide sulfonic acids; and
   mistures of these salts.

3. The composition of claim 2 wherein the metal salt is potassium diphenylsulfone-4-sulfonate.

4. The composition of claim 2 wherein the metal salt is sodium diphenylsulfone-3-sulfonate.

5. The composition of claim 2 wherein the metal salt is sodium benzenesulfonate.

6. The composition of claim 1 wherein the aromatic halide is decabromodiphenyl ether.

7. The composition of claim 1 wherein the aromatic halide is decabromodiphenyl carbonate.

8. The composition of claim 1 wherein the aromatic halide is bis(pentabromophenoxy)ethane.

9. The composition of claim 1 wherein the aromatic halide is tetrachloro-bisphenol A-polycarbonate.

10. The composition of claim 1 wherein the aromatic halide is tetrabromo-bispheno A-polycarbonate.

11. The composition of claim 1 which contains a flame-retardant additive selected from the group consisting of a siloxane, a fluorinated polyolefin and fibrous glass in an amount sufficient to render the aromatic carbonate polymer composition non-dripping in the proximity of a flame.

12. The composition of claim 1 which contains 0.01 to about 5.0 weight percent, based on the total weight of the polycarbonate composition of a siloxane of the following formula:

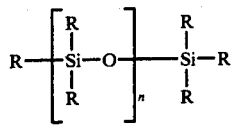

wherein the R's are independently selected from the group consisting of hydrogen, hydroxy, alkyl of from 1 to 6 carbon atoms, alkoxy of from 1 to 6 carbon atoms, alkenyl from 2 to 8 carbon atoms; alkynyl from 2 to 10 carbon atoms, aryl from 6 to 10 carbon atoms, aryloxy from 6 to 10 carbon atoms and wherein the R's may be substituted by halogen, hydroxy, amino, alkoxy of 1 to 6 carbon atoms, aryloxy of 6 to 10 carbon atoms, arylthio and alkylamino wherein the alkyl portion contains 1 to 6 carbon atoms, arythio and arylamino wherein the aryl portion contains 6 to 10 carbon atoms and wherein $n$ is an integer having a value of one or more.

13. The composition of claim 1 which contains 0.01 to about 2.0 weight percent based on the total weight of the polycarbonate of a fluorinated polyolefin.

14. The composition of claim 1 which contains fibrous glass.

* * * * *

UNITED STATES PATENT AND TRADEMARK OFFICE
CERTIFICATE OF CORRECTION

PATENT NO. : 4,110,299
DATED : August 29, 1978
INVENTOR(S) : Victor Mark

It is certified that error appears in the above-identified patent and that said Letters Patent are hereby corrected as shown below:

Col. 11, in the TABLE, line of "A'", delete "V-0" (first occurrence) and insert -- Teflon 6 --

Col. 12, in the TABLE, line of "U'", the column under "Additive III", after "Decabromodi-", insert --phenyl ether--

Col. 13, line 3, "monomer" should be -- monomeric --

, line 20, after "a is" insert -- an --

, line 20, after "1", delete the second "1"

, line 21, delete "and b is 6"

Col. 14, line 14, delete "considering" and insert --consisting--

Col. 15, line 5, "bispheno A" should be --bisphenol A--

Col. 16, line 13, "10" should be -- 18 --

Signed and Sealed this

Eighth Day of May 1979

[SEAL]

Attest:

RUTH C. MASON
Attesting Officer

DONALD W. BANNER
Commissioner of Patents and Trademarks